UNITED STATES PATENT OFFICE.

DAMON R. AVERILL, OF NEW CENTREVILLE, NEW YORK.

IMPROVEMENT IN THE MANUFACTURE OF PAINTS.

Specification forming part of Letters Patent No. 121,146, dated November 21, 1871.

*To all whom it may concern:*

Be it known that I, DAMON R. AVERILL, of New Centreville, in the county of Oswego and State of New York, have invented certain new and useful Improvements in Paint, of which the following is a full and complete specification:

This invention relates to improvements in the manufacture of paints, whereby a cheap, glossy, and durable paint is produced.

As one example from many, I take sixty pounds of the oxide of zinc or any other pigment used for painting. First, I make a solution of acetate of lead or the sulphate of zinc, or any of the salts of metals, either separately or combined, of sufficient strength to work about 3° Baumé. Of this solution I take about two gallons and wet the aforesaid oxide of zinc or other pigments. To this mixture I add sufficient drying-oil or its equivalent to make it of the proper consistency for painting with or without the addition of benzine or turpentine.

The essential feature of this invention is the wetting of the oxide of zinc, carbonate of lead, or other material to form the body of a paint with a solution of acetate of lead, sulphate of zinc, or other equivalent metallic salt, and afterward combining the whole material with linseed or other drying oil. Any of the ordinary pigments may also be combined with the base either before or after wetting with metallic salt.

To give the paint a glossy appearance, and also to render it hard and making it dry quicker, any of the suitable varnishes may be added; and also a composition of the nature of size, solutions of gums, balsams, gelatines, and the like.

What I claim as my improvement, and desire to secure by Letters Patent, is—

1. A process for combining the materials to form a paint, consisting in wetting the base or body with a solution of a metallic salt, and then combining the wet material with oil or its oleaginous equivalent to form a paint, substantially as described.

2. The herein-described compound, when composed of the ingredients and combined in the order and manner set forth, for the purpose specified.

DAMON R. AVERILL.

Witnesses:
J. H. BURRIDGE,
W. H. BURRIDGE. (107)